(12) United States Patent
Dumoulin et al.

(10) Patent No.: US 9,014,882 B2
(45) Date of Patent: Apr. 21, 2015

(54) METHOD AND DEVICE FOR AIDING THE FLIGHT MANAGEMENT OF AN AIRCRAFT DURING A LANDING PHASE

(71) Applicant: Airbus Operations SAS, Toulouse (FR)

(72) Inventors: Anne Dumoulin, Toulouse (FR); Marc Locheron, Toulouse (FR)

(73) Assignee: Airbus Operations SAS (FR)

( * ) Notice: Subject to any disclaimer, the term of this patent is extended or adjusted under 35 U.S.C. 154(b) by 55 days.

(21) Appl. No.: 13/886,419

(22) Filed: May 3, 2013

(65) Prior Publication Data
US 2013/0304285 A1 Nov. 14, 2013

(30) Foreign Application Priority Data
May 9, 2012 (FR) .................................... 12 54201

(51) Int. Cl.
G06F 19/00 (2011.01)
G08G 5/02 (2006.01)
G05D 1/06 (2006.01)

(52) U.S. Cl.
CPC .................. *G08G 5/02* (2013.01); *G08G 5/025* (2013.01); *G05D 1/0676* (2013.01)

(58) Field of Classification Search
CPC .................................. G08G 5/025; G08G 5/02
USPC .......................................... 701/14, 16, 17, 18
See application file for complete search history.

(56) References Cited

U.S. PATENT DOCUMENTS

| 7,084,785 B2 | 8/2006 | Rouquette et al. |
| 8,019,495 B2 | 9/2011 | Markiton et al. |
| 2004/0044446 A1 | 3/2004 | Staggs |
| 2009/0043434 A1* | 2/2009 | Deker ............................ 701/16 |

FOREIGN PATENT DOCUMENTS

| FR | 2852684 A1 | 9/2004 |
| FR | 2896071 A1 | 7/2007 |

* cited by examiner

*Primary Examiner* — Thomas Tarcza
*Assistant Examiner* — Kevin Myhre
(74) *Attorney, Agent, or Firm* — Lerner, David, Littenberg, Krumholz & Mentlik, LLP

(57) ABSTRACT

A device aiding the flight management of an aircraft during a phase of landing on an airport includes means for automatically determining an adaptive aiming point that is shifted along the runway in the downstream direction and which can be used by different usual landing aid means of the aircraft.

12 Claims, 2 Drawing Sheets

METHOD AND DEVICE FOR AIDING THE FLIGHT MANAGEMENT OF AN AIRCRAFT DURING A LANDING PHASE

The present invention relates to a method and a device for aiding the flight management of an aircraft, in particular a transport aircraft, during a phase of landing on an airport.

In the context of the present invention, the landing phase comprises the approach phase and the touchdown of the wheels of the aircraft on the runway.

It is known that, usually and according to a standard procedure, in order to land, an aircraft descends from a start of descent altitude to a predetermined altitude (generally of the order of 3000 feet) whilst maintaining a constant speed. When it arrives at this predetermined altitude, the aircraft decelerates down to an intermediate speed. The aircraft then intercepts a descent alignment path corresponding to the airport and to the runway used. The standard slope during the final approach is fixed at −3°. During this phase, the aircraft continues to decelerate whilst extending the slats, the flaps and the landing gear in order to change into the landing configuration. At about 1000 feet above the ground, the aircraft maintains a selected stabilized approach (which depends on the configuration of the aircraft and on the meteorological conditions) down to 50 feet above the threshold of the runway, and then it initiates a flare in order to come into contact with the runway and complete its landing.

It is known that one of the many objectives of those involved in aeronautics (aircraft manufacturers, airports, air companies) is to reduce the environmental impacts (noise, fuel consumption) in the vicinity of airports.

The final approach is generally located on a path defined by beams (of the "locating" and "glide path" type) of an ILS (Instrument Landing System) system, which imposes the location of an aiming point, that is to say a point where the descent path joins the runway.

New navigation technologies now make it possible to carry out satellite-guided approaches. Approaches for which only lateral guidance is provided are called non-precision approaches, for example when only GPS (Global Positioning System) systems are used. On the other hand, precision approaches refer to cases where the aircraft is also guided in the vertical plane, having recourse to systems such as the GLS (GBAS Landing System, where GBAS signifies "Ground-Based Augmentation System") system. In the case of non-precision approaches or of no-constraints precision approaches using ground guidance means like the ILS or the MLS, the pilot can be free to position his plan of approach. However, he practically always chooses to take, for safety and though lack of knowledge of the minimum braking distance required for the actual conditions (conditions at the moment of landing), the runway threshold as a reference point, from which the aiming point is derived.

For most non-precision approaches, the final approach is defined in the navigation database in such a way that the aircraft arrives at a predetermined height (50 feet) above the threshold of the runway. This choice is based on the precision approach of the ILS type, among others, for the following reasons:

at each landing, a performance calculation is carried out in order to determine if the available runway is sufficient or not. A unique pre-coded approach makes it possible to simplify the pilot's task;

visual signals (VASI/PAPI lights) are placed on the threshold of the runway—and required for certain air companies—in order to guide the pilot on his final flight path; and landing on a shorter runway additionally requires "reverse" thrust. In the absence of particular obligations, an air company has no particular reason to use the engines of its aircraft prematurely.

However, during a visual approach, in particular with turboprops, it can happen that the pilot requests authorization to touch down farther downstream on the runway, in the case for example where the terminal is at the other end of the runway. In this case, the pilot must carry out performance calculations during the landing in order to choose the new aiming point, which must be such that the landing can be carried out with total safety, which considerably increases the work load of the pilot and allows a risk of error to remain.

Various aspects of the present invention may overcome these disadvantages. The invention relates to a method for aiding the flight management of an aircraft during a landing on an airport phase, a method according to which the aircraft flies along a final approach path which joins the runway used at an aiming point, a method which makes it possible to reduce the work load of the crew of the aircraft and to provide automation making it possible to operate favorably with regard to the safety of the aircraft.

For this purpose, according to an aspect of the invention, said method is noteworthy in that:
a) information relative to actual conditions regarding the environment (meteorological, . . . ) and the runway (state, . . . ) is received;
b) using this information and characteristics of the runway (slope, . . . ), a maximum shift is determined which corresponds to the maximum longitudinal shift along the runway, with respect to the runway threshold, of the point of passage of the aircraft at a predetermined height with respect to the runway; c) using information relative to actual conditions regarding the environment and the runway, predetermined criteria and said maximum shift, an actual shift is determined which is less than said maximum shift, as well as a shift point which is shifted from the threshold of the runway along the latter in the downstream direction by the length of said actual shift;
d) from said shift point, a so-called adaptive aiming point is calculated; and
e) this adaptive aiming point is transmitted to landing aid means of the aircraft.

Thus, thanks to the invention, a (shifted) aiming point is determined, called the adaptive aiming point, of the "A-RAP" (Adaptive Runway Aiming Point) type, which is therefore shifted along the runway in the downstream direction and which can be used by different usual landing aid means as specified below. This automatic calculation makes it possible to reduce the work load of the pilot. Moreover, thanks to the invention, as further explained below, a precise calculation of the aiming point is carried out which is moreover adapted to the actual conditions encountered at the time of the landing, regarding both the external environment (meteorological conditions) and the runway used (state, slope, . . . ).

Moreover, advantageously, said predetermined criteria take account of an air company indication relating to a cost compromise: fuel consumption, wear of brakes and engines and noise cost.

Using the adaptive aiming point, the aircraft follows the same procedure as at present as far as the level flight section, but it intercepts the descent alignment later, the flight path in this case aiming at said adaptive aiming point (which is shifted with respect to the runway threshold). This makes it possible to fly the aircraft higher for a same distance to the runway threshold and therefore has a positive impact with regard to noise.

The method according to an aspect of the invention furthermore provides flexibility in the choice of an approach making it possible, depending on the case:
to reduce sound nuisance;
to reduce the costs of the air company associated with anti-noise measures established by certain airports; and
to increase the capacity of a runway in the case where the exit taxiway is very distant from the runway threshold.

In a preferred embodiment, in step b), in order to determine said maximum shift:
there is calculated a required runway length, representing the runway length necessary for carrying out the landing, from actual conditions regarding the environment and the runway, from characteristics of the envisaged approach and from performance figures of the aircraft; and
this required runway length is subtracted from an available length in order to obtain said maximum shift.

Advantageously, said available length corresponds to one of the following lengths:
a usual available runway length of the LDA (Landing Distance Available) type; and
in the case of an envisaged exit at an exit taxiway, an auxiliary runway length, which is defined from the threshold of the runway to said exit taxiway.

Moreover, advantageously, in step c), in order to determine said actual shift:
a coefficient is calculated, which is less than 1 and which depends on said actual conditions and on said predetermined criteria; and
said maximum shift is multiplied by this coefficient in order to obtain said actual shift.

Moreover, advantageously, a pilot is informed (preferably using a display) of the taking into account of the adaptive aiming point by the landing aid means of the aircraft.

The present invention also relates to a method of aiding the approach (precision or non-precision) for the purpose of a landing, using landing aid means which take into account an aiming point on the runway of an airport, according to which the method mentioned above is implemented, in order to determine an adaptive aiming point and to transmit it to said landing aid means. The present invention can also be applied to different usual methods (FLS, GLS, . . . ) as specified below.

The present invention also relates to a device aiding the flight management of an aircraft during a phase of landing on an airport.

According to an embodiment of the invention, said device comprises:
means for receiving information relative to actual conditions regarding the environment and the runway;
means for determining, using this information and characteristics of the runway, a maximum shift which corresponds to the maximum longitudinal shift with respect to the runway threshold, along the runway, from the point of passage of the aircraft at a predetermined height with respect to the runway;
means for determining, using information relative to actual conditions regarding the environment and the runway, predetermined criteria and said maximum shift, an actual shift which is less than said maximum shift, as well as a shift point which is shifted from the threshold of the runway along the latter in the downstream direction by the length of said actual shift;
means for calculating, from said shift point, a so-called adaptive aiming point; and
means for transmitting this adaptive aiming point to landing aid means of the aircraft.

In a particular embodiment, said device furthermore comprises:
means for generating at least said information relative to actual conditions regarding the environment and the runway; and/or
means for activating said approach aid device; and/or
means for informing a pilot of the taking into account of the adaptive aiming point by the landing aid means; and/or
means, notably of the head-up type, for displaying said adaptive aiming point in the cockpit of the aircraft.

The present invention can also relate to:
a system aiding approach for the purpose of a landing, comprising landing aid means which take into account an aiming point on a runway of an airport, said system comprising a device such as mentioned above, for determining an adaptive aiming point and transmitting it to said landing aid means; and/or
an aircraft, in particular a transport aircraft, which is provided with such a system and/or with such a device.

The figures of the appended drawing will give a good understanding of how the invention may be embodied. In these figures, identical references denote similar elements.

Figure 1:
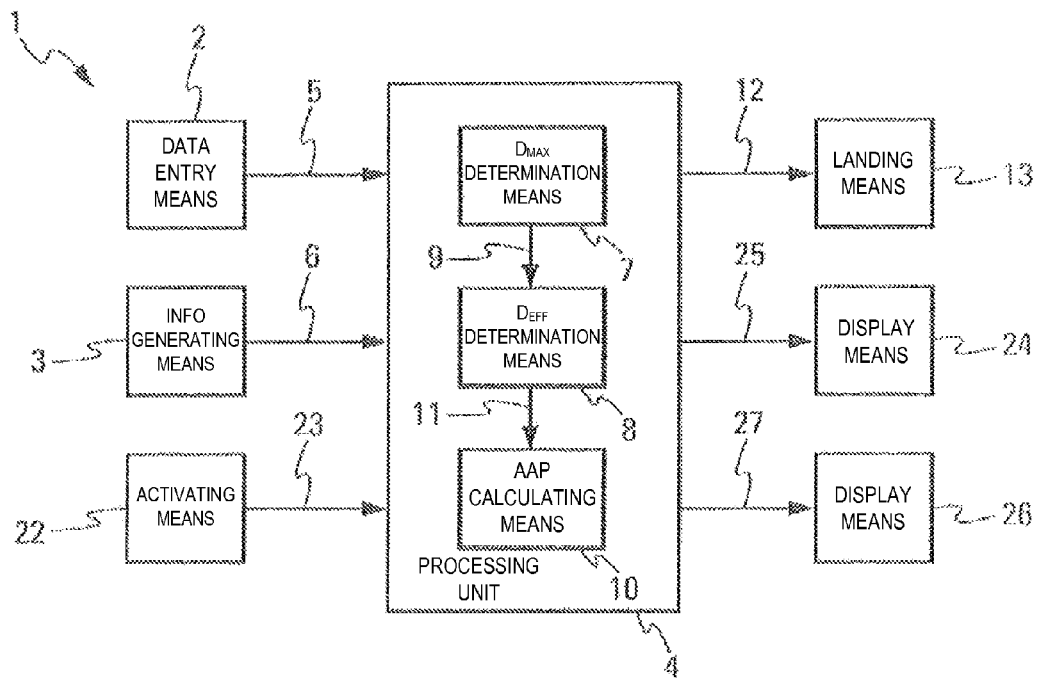
FIG. 1 is the block diagram of a device according to an embodiment of the invention.

The device 1 according to an embodiment of the invention and shown diagrammatically in FIG. 1 is intended to aid the flight management of an aircraft AC during the phase of landing on an airport. This aircraft AC can in particular be a civil or military aircraft, a passenger transport aircraft or a freight aircraft.

Usually, during a phase of landing on a runway 15 of an airport, the aircraft AC flies along a final approach path 16 (shown in dashed line in FIG. 2) which has a predetermined slope, generally 3°, and which joins the runway 15 used at an aiming point (or touchdown point) P1$i$ (situated downstream of the threshold 15A of the runway 15). The flight path 17 actually followed by the aircraft AC in this case is superimposed on this path 16 up to the proximity of the runway, with a passage above the threshold 15A at a predetermined height (at a point P0$i$), generally 50 feet, and then exhibits a flare 18 before the contact with the runway 15.

According to an embodiment of the invention, said device 1 which is installed in the aircraft AC, comprises:
means 2, for example a keyboard and/or a mouse associated with a screen, which allow a crew member of the aircraft AC (or automatic means) to enter data and notably criteria specified below into the device 1;
an assembly 3 of usual means for generating information relative to the actual conditions regarding the environment (meteorological, . . . ) and the runway (state, . . . ), at the time of the landing, as described below;
a processing unit 4 which is connected by the intermediary of links 5 and 6 to said means 2 and to said assembly 3 respectively, and which comprises:
means 7 which are formed in such a way as to determine, using this information (relative to actual conditions regarding the environment and the runway 15) and characteristics of the runway 15, a maximum shift Dmax which corresponds to the maximum longitudinal shift with respect to the runway threshold 15A, along the runway 15, of the point P0$i$ (of passage of the aircraft AC at a predetermined height (generally 50 feet) with respect to the runway 15);

means 8 which are connected by the intermediary of a link 9 to said means 7 and which are formed in such a way as to determine, using said information relative to actual conditions regarding the environment and the runway 15, predetermined criteria and said maximum shift Dmax, an actual shift Deff which is less than said maximum shift Dmax, as well as a shift point P0ƒ (FIG. 3) which is shifted from the point P0i along the runway in the downstream direction by the length of said actual shift Deff; and means 10 which are connected by the intermediary of a link 11 to said means 8 and which are formed in such a way as to calculate, from said shift point P0ƒ, a so-called adaptive aiming point P1ƒ; and means (for example a link 12) for transmitting this adaptive aiming point P1ƒ to landing means 13 of the aircraft.

Thus, the device 1 according to an embodiment of the invention automatically determines a so-called adaptive (shifted) aiming point P1ƒ, of the A-RAP (Adaptive Runway Aiming Point) type, which is therefore shifted along the runway 15 in the downstream direction and which can be used by different usual landing aid means as specified above. This automatic calculation makes it possible to reduce the work load of the pilot. Moreover, the device 1 carries out an accurate calculation of the aiming point P1ƒ, which is furthermore adapted to the actual conditions encountered at the time of the landing, regarding both the external environment (meteorological conditions) and the runway 15 used (state (dry, wet, . . . ), slope, . . . ).

Figure 2:
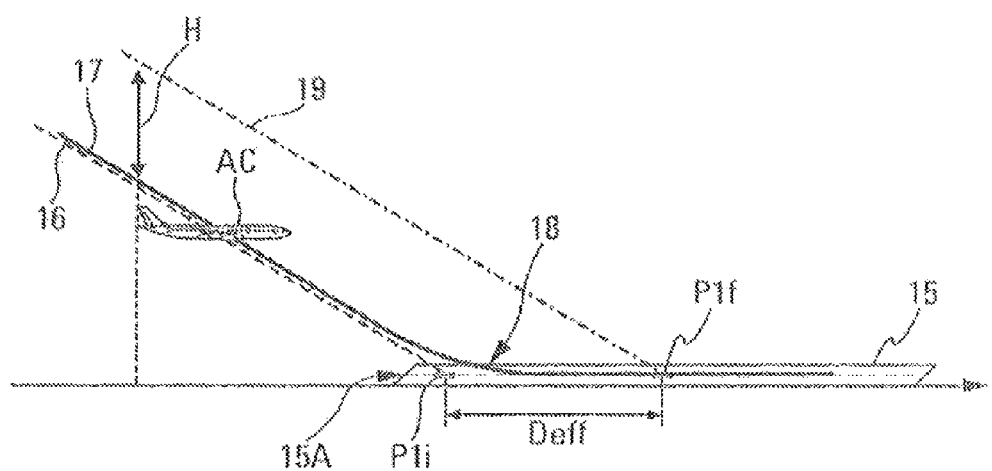
FIGS. 2 to 4 are diagrammatic representations of the landing of an aircraft on a runway, making it possible to reveal the essential features of the invention.

By using the adaptive aiming point P1ƒ, the aircraft AC follows the same procedure as at present up to the level flight section, but it intercepts the descent alignment later. As shown in FIG. 2, the new flight path 19 (shown in dotted and dashed line) in this case aims at said adaptive aiming point P1ƒ (which is shifted with respect to the habitual aiming point P1i). This makes it possible to fly the aircraft AC higher (height H between the paths 16 and 19) for a same distance to the runway threshold, and therefore has a positive impact on noise.

The device 1 according to an embodiment of the invention thus provides the advantage of flexibility in the choice of an approach, making it possible, depending on the case:

to reduce sound nuisance;

to reduce the costs of the company associated with anti-noise measures established by certain airports; and to increase the capacity of a runway in the case where the exit taxiway is very distant from the threshold of the runway, as specified below.

In a preferred embodiment, in order to determine said maximum shift Dmax, said means 7 comprise integrated elements for, respectively:

calculating, in the usual manner, a required length of runway L1, of the RLD (Required Landing Distance) type. This required runway length L1 represents the length of runway necessary in order to carry out the landing, on the basis of the actual conditions regarding the environment and the runway 15, characteristics of the envisaged approach and performance figures of the aircraft AC. The required runway length L1 is therefore related to the envisaged alternative approach and not to the conventional approach. In fact, the pilot who wishes to carry out a steeper approach onto a shifted aiming point may wish to take advantage of this in order to adopt a final approach with a different slope, notably an increased one (for example 4° instead of 3°). Because of this, the required runway distance is not that which he would have had with a conventional approach; and subtracting this required runway length L1 from an available length L2A, L2B in order to obtain said maximum shift Dmax.

Figure 3:
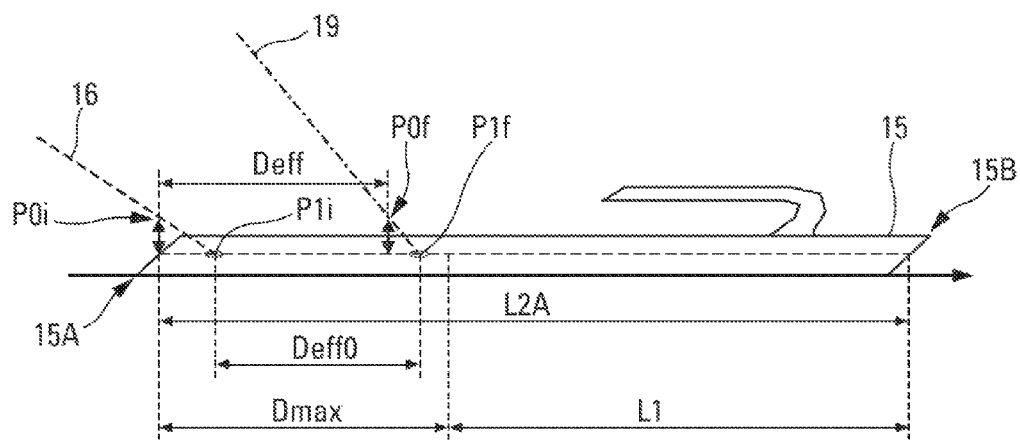
Figure 4:
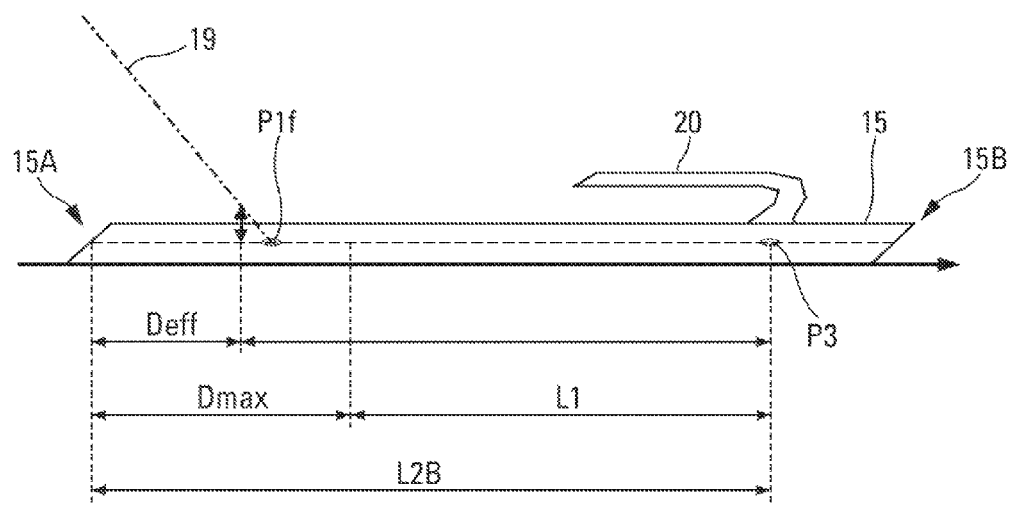

Said available length corresponds:

either to an available runway length L2A, of the LDA (Landing Distance Available) type, which is defined between the threshold 15A of the runway and the downstream end 15B, as shown in FIG. 3, in a standard situation;

or, in the case of an envisaged exit at an exit taxiway 20 (therefore situated upstream of the end 15B), to an auxiliary runway length L2B, which is defined from the threshold 15A of the runway to the position P3 of said exit taxiway 20, as shown in FIG. 4.

Consequently, Dmax satisfies one of the following equations (depending on the envisaged exit):

$$D\text{max}=L2A-L1; \text{ or}$$

$$D\text{max}=L2B-L1.$$

Moreover, in a preferred embodiment, in order to determine said maximum shift Dmax, said means comprise integrated elements for, respectively:

calculating a coefficient C, which is less than or equal to 1 (so that Deff remains less than or equal to Dmax) and which depends on said actual conditions and on said predetermined criteria; and multiplying said maximum shift Dmax by this coefficient C in order to obtain said actual shift Deff.

Consequently, Deff satisfies the following expression:

$$D\text{eff}=C \cdot D\text{max}$$

Preferably, said predetermined criteria take into account an indication from an air company, relative to a compromise regarding the costs: fuel consumption, wear of brakes and engines, and noise cost.

Said criterion C thus depends:

on current meteorological data;

on characteristics of the runway 15 (state, . . . ); and on the policy of the company (notably regarding a compromise on the costs).

The shift point P0ƒ (FIG. 3) determined by the means 8 is therefore the new point where the new flight path 19 passes at 50 feet from the ground. As a function of this point P0ƒ and of the envisaged slope of the new linear flight path 19, it is easy for the means 10 to determine the adaptive aiming point P1ƒ (which is the touch down point of this flight path 19). Of course, if the slopes of the envisaged approaches for the paths 16 and 19 are the same, the distance Deff0 between P1i and P1ƒ is equal to said distance Deff (between P0i and P0ƒ).

In a particular embodiment, the device 1 also comprises means 22 which are connected by the intermediary of a link 23 to the processing unit 4 and which are formed in such a way as to activate said device 1.

In order to activate the device 1, several solutions can be considered:

choice of the pilot via a control unit of the MCDU (Multi-purpose Control and Display Unit) type;

choice imposed by the company (transparent for the pilots); or choice of a system of the FMS type.

Moreover, in a particular embodiment, said device 1 also comprises means 24 which are connected by the intermediary of a link 25 to the processing unit 4 and which are intended to inform a pilot (notably by a display) of the taking into account of the adaptive aiming point P1ƒ by the landing aid means 13. It is in fact necessary to indicate to the pilot that he is carrying out an approach of the A-RAP type since, in this case, the aircraft AC will be made to intercept the final approach path 19 later than for the published approach path (path 16).

In a particular embodiment, said device 1 can also comprise display means 26 (which are connected by the intermediary of a link 27 to the processing unit 4), in order to display said adaptive aiming point P1$f$ in the cockpit of the aircraft AC.

Preferably, these display means 26 are of the head-up type so as to display the aiming point P1$f$ superimposed on the external environment seen by the pilot in front of the aircraft AC, which makes it possible to indicate the exact position of that point on the runway.

Thus, thanks to the device 1 according to an embodiment of the invention, the aiming point P1$f$ is automatically positioned, notably as a function of:

usual parameters which are used in a performance calculation during landing;

the exit taxiway 20; and an indicator reflecting the strategy of the company. For example, one company will prefer to preserve the brakes and engines to the detriment of the noise during the approach, whereas another company will desire to minimize the noise during the final approach at any cost.

The device 1 according to an embodiment of the invention can be applied to different on-board systems for aiding approach management, comprising landing aid means 13 which take into account an aiming point on a runway 15 of an airport.

It is possible, in particular, to apply aspects of the invention to usual so-called non-precision approach systems (FLS approach for example) or systems based on satellite guidance technologies or GPS (GLS, SLS, . . . ) or of the F-APP (BARO-V-Nav) type.

Thus:

in the case of an F-APP (BARO-V-Nav) function, the optimized aiming point is calculated by a system, such as an FMS system for example, in which the device 1 will be integrated, in order to predict the new approach flight path taking this shift into account; and in the case of a GLS/SLS with GEO-V-Nav function, a certain number of approach paths are pre-defined and stored in a database. As a function of the current conditions, the optimized aiming point, calculated by the device 1, allows the FMS system and/or an FCGS system to use the most pertinent path.

Moreover, in a preferred application, the device 1 according to an embodiment of the invention is associated with a system for aiding the management of the approach of an aircraft, which implements a function of the FLS (FMS Landing System) type.

In an FLS approach, the final flight path is defined on board the aircraft by a flight management system, of the FMS (Flight Management System) type, from pre-defined data in a navigation database or data entered by the pilot during the preparation of the approach phase. It is therefore possible to modify certain parameters, such as the aiming point.

The FLS function proposes a vertical construction of a fixed approach path, from information published on maps whilst providing a correction of the cold temperature barometric altitude, in order to allow the aircraft to fly in standard conditions. The FMS system defines this final segment from the following parameters: slope, direction and touch down point (or aiming point). Such a non-precision approach mode of the FLS type is described, for example, in the patents FR-2 852 683, FR-2 852 684 and FR-2 852 686.

Thanks to the invention, a new optimized touch down point (adaptive aiming point P1$f$) is calculated by means of the device 1 which is integrated in an ancillary system or in the FMS system. Because of this, this touch down point is shifted, whilst the other characteristics of the FLS function (route and slope) are retained.

Thus, at a same distance from the runway, the aircraft AC flies above the published (legally authorized) flight path 16, and the obstacle avoidance margins are thus geometrically maintained.

It is possible to retain the FLS function as it is, with an adaptive aiming (or touch down) point, limited by pre-defined operational limits. The FLS function can also continue to propose the reference aiming point if the overall benefit (environment, capacity, . . . ) is not advantageous.

The adaptive aiming point is calculated by the device 1, which can be integrated:

in the FMS system;

in a guidance and control computer of the FCGS (Flight Control and Guidance System) type or;

in another on-board system.

The A-RAP function, used by the device 1, can be presented in the form of an option for the pilots, or it can be basic and implemented in order to translate a policy of the air company.

The invention claimed is:

1. A method for aiding the flight management of an aircraft during a landing on an airport phase, a method according to which the aircraft flies along a final approach path joining the runway used at an aiming point, wherein, automatically:

a) receiving information relative to actual conditions regarding the environment and the runway;

b) determining, using the information and characteristics of the runway, a maximum shift corresponding to the maximum longitudinal shift along the runway, with respect to the runway threshold, of the point of passage of the aircraft at a predetermined height with respect to the runway;

c) determining, using actual conditions regarding the environment and the runway, predetermined criteria and said maximum shift, an actual shift less than said maximum shift, as well as a shift point shifted from the threshold of the runway along the latter in the downstream direction by the length of said actual shift, the determining including:

calculating, depending on said actual conditions and on said predetermined criteria, a coefficient less than 1, and multiplying said maximum shift by the coefficient to obtain said actual shift;

d) calculating from said shift point, a so-called adaptive aiming point; and e) transmitting the adaptive aiming point to landing aid means of the aircraft.

2. The method as claimed in claim 1, wherein, in step b), to determine said maximum shift:

calculating a required runway length, representing the runway length necessary for carrying out the landing, from actual conditions regarding the environment and the runway, from characteristics of the envisaged approach and from performance figures of the aircraft; and subtracting the required runway length from an available length to obtain said maximum shift.

3. The method as claimed in claim 2, wherein said available length corresponds to one of the following lengths:

an available runway length; and in the case of an envisaged exit at an exit taxiway, an auxiliary runway length defined from the threshold of the runway to said exit taxiway.

4. The method as claimed in claim 1, wherein said predetermined criteria take account of an air company indication.

5. The method as claimed in claim 1, wherein, if necessary, informing a pilot of the taking into account of the adaptive aiming point by the landing aid means of the aircraft.

6. The method as claimed in claim 1, further comprising using a landing aid means which take into account the aiming point on the runway of an airport.

7. A device aiding the flight management of an aircraft during a phase of landing on an airport, said aircraft being able to fly along a final approach path which joins the runway used at an aiming point, the device comprising:
   means for receiving information relative to actual conditions regarding the environment and the runway;
   means for determining, using the information and characteristics of the runway, a maximum shift corresponding to the maximum longitudinal shift with respect to the runway threshold, along the runway, from the point of passage of the aircraft at a predetermined height with respect to the runway;
   means for determining, using information relative to actual conditions regarding the environment and the runway, predetermined criteria and said maximum shift, an actual shift less than said maximum shift, as well as a shift point shifted from the threshold of the runway along the latter in the downstream direction by the length of said actual shift, said mean configured to calculate, depending on said actual conditions and on said predetermined criteria, a coefficient less than 1, and to multiply said maximum shift by the coefficient to obtain said actual shift;
   means for calculating, from said shift point, a so-called adaptive aiming point; and
   means for transmitting the adaptive aiming point to landing aid means of the aircraft.

8. The device as claimed in claim 7, further comprising means for generating at least said information relative to actual conditions regarding the environment and the runway.

9. The device as claimed in claim 7, further comprising means for activating said device.

10. The device as claimed in claim 7, further comprising means of informing a pilot of the taking into account of the adaptive aiming point by the landing aid means.

11. The device as claimed in claim 7, further comprising means for displaying said adaptive aiming point in the cockpit of the aircraft.

12. A system aiding the management of the approach of an aircraft for the purpose of a landing, said system comprising landing aid means which take into account an aiming point on a runway of an airport, wherein the system further comprises a device, for determining an adaptive aiming point and transmitting the adaptive aiming point to said landing aid means, the device aiding the flight management of an aircraft during a phase of landing on an airport, said aircraft being able to fly along a final approach path which joins the runway used at an aiming point, the device comprising:
   means for receiving information relative to actual conditions regarding the environment and the runway;
   means for determining, using the information and characteristics of the runway, a maximum shift corresponding to the maximum longitudinal shift with respect to the runway threshold, along the runway, from the point of passage of the aircraft at a predetermined height with respect to the runway;
   means for determining, using information relative to actual conditions regarding the environment and the runway, predetermined criteria and said maximum shift, an actual shift less than said maximum shift, as well as a shift point shifted from the threshold of the runway along the latter in the downstream direction by the length of said actual shift, said mean configured to calculate, depending on said actual conditions and on said predetermined criteria, a coefficient less than 1, and to multiply said maximum shift by the coefficient to obtain said actual shift.

* * * * *